(12) United States Patent
Fujishima et al.

(10) Patent No.: US 8,340,018 B2
(45) Date of Patent: Dec. 25, 2012

(54) WIRELESS COMMUNICATION SYSTEM, RADIO BASE STATION APPARATUS AND RADIO TERMINAL APPARATUS

(75) Inventors: Kenzaburo Fujishima, Kokubunji (JP); Masanori Taira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 800 days.

(21) Appl. No.: 12/295,917

(22) PCT Filed: Apr. 6, 2006

(86) PCT No.: PCT/JP2006/307793
§ 371 (c)(1),
(2), (4) Date: Oct. 3, 2008

(87) PCT Pub. No.: WO2007/113923
PCT Pub. Date: Oct. 11, 2007

(65) Prior Publication Data
US 2009/0279512 A1 Nov. 12, 2009

(51) Int. Cl.
*H04W 4/00* (2009.01)
(52) U.S. Cl. .......... 370/328; 455/403; 455/422.1; 455/450
(58) Field of Classification Search ............ 370/228, 370/229, 335, 336, 310, 328, 329, 464, 478, 370/479; 455/403, 422.1, 450–454
See application file for complete search history.

(56) References Cited

U.S. PATENT DOCUMENTS

| | | | |
|---|---|---|---|
| 6,636,493 B1 | 10/2003 | Doi et al. | |
| 2002/0068590 A1 | 6/2002 | Suzuki et al. | |
| 2006/0094468 A1* | 5/2006 | Hoshino et al. | 455/561 |
| 2006/0251036 A1* | 11/2006 | Gollamudi et al. | 370/342 |

FOREIGN PATENT DOCUMENTS

| | | |
|---|---|---|
| JP | 3167682 | 3/2001 |
| JP | 2002-232350 A | 8/2002 |
| JP | 2002-325062 | 11/2002 |
| JP | 2003-110486 | 4/2003 |
| JP | 2003-304577 | 10/2003 |
| JP | 2004-165834 | 6/2004 |
| JP | 2005-159849 A | 6/2005 |
| JP | 2005-244857 A | 9/2005 |
| WO | WO 2004045109 A1 * | 5/2004 |

OTHER PUBLICATIONS

"Adaptive Antenna Systems" by B. Widrow, et al, Proceedings of the IEEE, vol. 55, No. 12, Dec. 1967.
3GPP2 C.S0024-A v1.0, Default (Subtype 0) and Subtype 1 Physical Layer Protocol, Mar. 2004, 19 pp.
"Data Throughput of CDMA-HDR a High Efficiency-High Data Rate Personal Communication Wireless System" by A. Jalali, et al., May 2000, 3 pp.
Japanese Office Action, Oct. 19, 2010, w translation, 3 pp.

* cited by examiner

Primary Examiner — Charles C Jiang
(74) Attorney, Agent, or Firm — Mattingly & Malure, PC

(57) ABSTRACT

A wireless communication system comprises radio base station apparatuses each of which transmits an estimation pilot in advance for estimating the quality of a downlink communication after a spatial signal processing performed after a time unified among the radio base station apparatuses; and radio terminal apparatuses each of which receives the estimation pilot to determine the quality of the downlink communication, thereby reporting the determined downlink communication quality to the radio base station apparatus via an uplink channel. The estimation pilot is transmitted at the same time and frequency established among the radio base station apparatuses by use of the same directivity beam as used for transmitting the data after the unified time.

26 Claims, 10 Drawing Sheets

SLOT = N

SLOT = N+M

| SLOT | Beam Gen. for Estimator (1009) | 2nd Beam Former (1011) | Beam Buffer (1008) | Beam Gen. for Detector (1007) | 1st Beam Former (1006) | 2nd TDM (1012) |
|---|---|---|---|---|---|---|
| 1 | BPG #1 | | | | | |
| 2 | BPG #2 | BPG #1 | BPG #1 | | | |
| 3 | BPG #3 | BPG #2 | BPG #2 | BPG #1 | | BPG #1 |
| 4 | BPG #4 | BPG #3 | BPG #3 | BPG #2 | BPG #1 | BPG #2 |
| 5 | BPG #5 | BPG #4 | BPG #4 | BPG #3 | BPG #2 | BPG #1 |
| | | | | | | BPG #3 |

FIG. 7A

| MS-ID | Priority | Interval | Bit Length | Bit Stream |
|---|---|---|---|---|
| 1 | Low | 4 | 3000 | 01000101····· |
| 2 | High | 1 | 1000 | 11101101····· |

FIG. 7B

| MS-ID | Beam-ID | CQI(DRC) |
|---|---|---|
| 1 | 1 | 9 |
| 1 | 2 | 1 |
| 2 | 1 | 6 |
| 2 | 2 | Invalid |

FIG. 7C

| MS-ID | DOA[degree] |
|---|---|
| 1 | 300 |
| 2 | 90 |

WIRELESS COMMUNICATION SYSTEM, RADIO BASE STATION APPARATUS AND RADIO TERMINAL APPARATUS

BACKGROUND OF THE INVENTION

1. Technical Field

This invention relates to a technology capable of increasing a frequency utilization efficiency by an adaptive modulation communication based upon a feedback of a downlink communication quality in a base station equipped with a smart antenna technology.

2. Background Art

Recently, smart antenna technology using array antennas has been practically used for base stations and access points (hereinafter, collectively referred to as base station) of wireless communication systems such as portable telephones and wireless LANs. The operating principle of the smart antenna technology is disclosed in, for instance, B. Widrow, et al.: "Adaptive Antenna Systems", Proceedings IEEE, Vol. 55, No. 12, pages 2143 to 2159, December 1967. Base stations in which a plurality of terminals commonly utilize the same time and the same frequency and spatial multiplexing communications are performed based upon the smart antenna technology is disclosed in, for example, JP 3167682 B.

Further, while needs for data communications in wireless communication systems are increased, the cdma2000 EV-DO (Evolution Data Only) system having purposes of increasing peak transmission speeds of downlinks and of realizing high throughputs has been standardized as a packet transmission system of IMT-2000 (for example, 3GPP2 C.S0024-A "cdma2000 High Rate Packet Data Air Interface Specification", pages 13-42 to 13-78, Mar. 31, 2004). In the above-described high rate packet communication system, the packet scheduling is carried out in order to effectively utilize limited frequencies and limited time.

The packet scheduling technique in the EV-DO system is such a technique that a base station selects a mobile station which becomes a transmission destination of downlink data every time a time slot of 1.67 milliseconds has elapsed. In the case where mobile stations are selected, a wireless communication apparatus having high priority data and another wireless communication apparatus whose downlink communication quality is high are selected with a top priority. In this case, a downlink indicates a direction of a wireless communication that the base station transmits and the mobile station receives. In "Data Throughput of CDMA-HDR a High Efficiency-High Data Rate Personal Communication Wireless System" written by A. Jalali et al., IEEE 51st VTC2000-Spring, Volume 3, pages 1854 to 1858, May 2000, there has been reported the improvement in the frequency utilization efficiency of the cells by the application of the packet scheduling system called "Proportional Fairness" to the EV-DO system.

As typical packet scheduling systems, the following three sorts of systems are proposed:
(1) Maximum CIR system;
(2) Round Robin system; and
(3) Proportional Fairness system.

In the above-mentioned (1) Maximum CIR system, a transmission chance is allocated with a priority with respect to a mobile station having a superior communication quality of a downlink. Since a communication chance with respect to such a mobile station located in the vicinity of a base station is increased and a communication chance with respect to a remote mobile station is decreased, the Maximum CIR system corresponds to such a scheduling system that a service gap among the mobile stations becomes large. In the above-mentioned (2) Round Robin system, communication chances are uniformly allocated to all of the mobile stations. In the Round Robin system, the throughput of the base station is lowered, because the communication chances with respect to the remote mobile stations are increased, as compared with the throughput of the Maximum CIR system. In the above-mentioned (3) Proportional Fairness system, while instantaneous downlink communication quality/averaged downlink communication quality are employed as evaluation values, transmission chances are allocated to mobile stations having larger evaluation values with priorities. As a consequence, in the Proportional Fairness system, the communication chances are uniformly allocated, and further, the frequency utilization efficiency thereof becomes higher than that of the Round Robin system. It should be noted that the base station is required to correctly grasp instantaneous downlink communication qualities of the respective mobile stations.

In the EV-DO system, a mobile station estimates a downlink communication quality (SINR: Signal to Interference plus Noise Ratio) from a reception pilot signal, designates both a modulation system and a coding ratio (MCS: Modulation and Coding Scheme) that enable communication with a packet error lower than or equal to 1% in the SINR with reference to a table, and feeds back an index (DRC: Data Rate Control) corresponding to both the modulation system and the coding ratio to a base station. With employment of the above-described mechanism, the base station can grasp the instantaneous communication quality with respect to each of the mobile stations.

Since this operation may constitute the adaptive modulation for selecting the MCS in response to the feedback DRC, when the mobile station can correctly estimate the downlink communication quality, then the wireless communication can be carried out in higher efficiencies which are nearly equal to limitations in communication capacities. It should be noted that the packet scheduling is carried out after the instantaneous downlink communication quality has been fed back. As a result, an error may be produced when the SINR is estimated and when the SINR is acquired after completion of the packet scheduling due to a temporal changing factor such as a fading phenomenon.

SUMMARY OF THE INVENTION

This invention provides a base station and a mobile station, which perform packet scheduling by correctly feeding back downlink communication quality information (CQI: Channel Quality Information) in a wireless communication network which is constructed by a base station equipped with smart antenna technology (hereinafter, referred to as "smart antenna base station").

In the case where a base station executes an adaptive modulation according to a CQI fed back from a mobile station, a frequency utilization efficiency of cells is lowered due to an error of the CQI. For instance, when the mobile station estimates a downlink communication quality which is higher than the actual communication quality, the base station employs a high-degree modulation system and a high coding ratio. However, since an occurrence frequency of packet errors is increased, a frequency utilization efficiency is lowered. Conversely, when the mobile station estimates a downlink communication quality which is lower than the actual communication quality, the base station employs a simple modulation system and a low coding ratio, and hence an occurrence frequency of packet errors is lowered. However, the base station and the mobile station perform the communications in the low efficiency under such a condition in which communications may be carried out in a high efficiency. As a result, a frequency utilization efficiency is lowered. In order to avoid lowering of such a frequency utilization efficiency, it is an important challenge that the CQI is correctly estimated in the mobile station.

In a smart antenna base station, a CQI error may easily occur, as compared with that of a base station equipped with a sector antenna. The reason for this will now be described.

FIG. 1 is a sequence diagram showing communication operations performed between a base station and a mobile station in an EV-DO system. It should be noted that, in order to simplify the description, a round trip delay is neglected. Firstly, a base station (base station) transmits both data and a pilot with respect to a mobile station (mobile station) at a head of a slot N−1. The data is transmitted to a specific mobile station. This transmission destination has been determined by a packet scheduler executed in 1 preceding slot. The pilot is used as both a detection pilot of a reception signal and an estimation pilot of received SINR in the mobile station. In a step S101, the mobile station which has received the pilot determines an SINR so as to select a proper MCS, and then, feeds back an index (DRC) equivalent to the selected MCS to the base station.

In this case, information which is fed back to a base station is generally referred to as "CQI". In the EV-DO system, DRC corresponds to the CQI. However, essentially, if any other items may express an instantaneous downlink communication quality, which constitutes a selection basis of a mobile station by a packet scheduler, then other control signals may be employed, for example, an SINR itself estimated by a mobile station may be employed.

The base station which has received the fed-back CQI performs a packet scheduling in a step S102 to select a mobile station which becomes a transmission destination of data in a slot N. The above-described operation is repeatedly carried out for every slot.

In a smart antenna base station, since a spatial multiplexing communication can be performed by controlling a beam having a maximum strength and a null-steering direction, a plurality of mobile stations are simultaneously defined as data transmission destinations for every slot by a packet scheduler. Since shapes of directional beams are changed depending upon a combination of a plurality of selected mobile stations, it is conceivable that shapes of directional beams output from base stations are changed for every slot. This beam shape change is completely different from a sector antenna base station.

As a consequence, since the pilot and the directional beam of the data which are transmitted in the slot N are different from those transmitted in a slot N−1, an SINR estimated by the pilot of the slot N−1 is not corrected in the slot N. The object of this invention is to avoid lowering the frequency utilization efficiency due to the above-described SINR estimation error.

The above-described object has been achieved only in a limited range by JP 2004-165834 A. JP 2004-165834 A discloses the following technology: the base station transmits the pilot by the directional beam; the mobile station judges the downlink communication quality from the received pilot and feeds back the judged communication quality to the base station; and while the base station adaptively modulates the data by maintaining the same directional beam pattern, the base station transmits the adaptively modulated data to the mobile station.

However, the above-described technology cannot guarantee that the switching timing for the directional beam pattern is synchronized with each other between the base stations. In other words, when the SINR is estimated, and also, when the packet scheduling is accomplished, the shapes of the directional beams are not always identical to each other, which are output from base stations (hereinafter, referred to as "interference base stations") except for a base station (hereinafter, referred to as "desired base station") with which the mobile station is being communicated. As a result, intercell interference power cannot be correctly estimated. The adverse influence caused by this problem may particularly appear at a cell edge where the occupation ratio of the intercell interference occupied in the downlink communication quality is high, and may cause lowering of the frequency utilization efficiency of the mobile station, which is located in the cell edge.

In JP 2003-304577 A, the above-described object has been achieved on the premise that a switched beam is employed. JP 2003-304577 A discloses the following technology: the pilots are simultaneously transmitted by employing the omnidirectional beam provided by the base stations; the mobile station estimates reception power of the respective received pilots without discriminating the desired base station from the interference base station to feed back the estimated reception power to the desired base station; and the desired base station receives the notification of the beam number which is used in the data transmission from the interference base station, and estimates the SINR in the mobile station with reference to the feedback information from the mobile station.

Since this technology has been made on the premise of the switched beam, there is a directional beam by which the data is not transmitted among the directional beams provided by the base stations. When the SINR is estimated, it is uncertain which directional beam transmits the data at the time when the scheduling is accomplished. As a result, an SINR estimation error may occur. However, this technology solves the problem as follows: in order to eliminate the uncertainty caused by the SINR estimation error, the base station receives the notification of the beam number from the interference base station, and also the individual received power of the pilots, which is fed back. It should be noted that processings of eliminating the above-described uncertainty give the loads to both the mobile station and the base station. Also, if the shapes of the directional beams are different when the pilots are simultaneously transmitted and when the data is transmitted, this technology cannot be applied.

An object to be achieved by this invention will now be summarized in consideration of the above.

An object of this invention is to provide a base station and a mobile station in a wireless communication network constituted by a smart antenna base station, in which: when an SINR is estimated in the mobile station, the above-described uncertainty is eliminated by previously defining transmission directional beams of all of the base stations after scheduling; and when the SINR is estimated, all of the base stations simultaneously transmit the pilots by the transmission directional beams to perform correct SINR estimations containing also intercell interference after the scheduling.

The problem that, when the SINR is estimated in the mobile station, the interference power after the scheduling becomes uncertain can be solved as follows: there are provided a base station and a mobile station, the base station transmitting an estimation pilot in advance in order to estimate a downlink communication quality which is subjected to a spatial signal processing after a time unified among base stations, the mobile station receiving the estimation pilot to determine a downlink communication quality and then notifying the base station of the downlink communication quality via an uplink; the estimation pilot is transmitted within the same time at the same frequency among the base stations; and the estimation pilot is transmitted by the same directional beam as a directional beam which is employed so as to transmit data after the unified time.

FIG. 2B shows outputs of base stations in a slot N+M.

Reference numerals 2001-1 and 2001-2 represent cells which are covered by base stations which are located adjacent to each other. In a directional beam 2002 (2002-1 to 2002-4), both a detection pilot and data are output, whereas in another directional beam 2003 (2003-1 to 2003-2), an estimation pilot is output. In the directional beam 2002, the data has been adaptively modulated. In order to utilize this merit, a downlink communication quality must be correctly estimated by considering the directional beam output in the slot N+M. It should be noted that, if the downlink communication quality is estimated by employing a directional beam output different from the above-described directional beam output, then the law of causality cannot be satisfied, and hence the correct estimation cannot be carried out.

As a consequence, as shown in FIG. 2A, in order to satisfy the law of causality, at a time of a slot N, the directional beam output of the slot M+N is defined, an estimation pilot is output in this beam 2002, and the mobile station estimates a downlink communication quality to feed back the estimated downlink communication quality to the base station. As a result, since a transmission path quality of the slot M+N can be estimated at the time of the slot N, the above-described object can be achieved. It should also be noted that, in order to increase estimation precision of the communication qualities, it is desirable to multiplex the signal of the directional beam 2002 with the signal of the directional beam 2003 shown in FIG. 2B (by utilizing, for example, time division multiplexing, or frequency division multiplexing) within a slot in order that these signals do not interfere with each other.

Further, the problem about the correct SINR estimation after the scheduling, which contains the intercell interference, can also be solved by the same wireless communication system. This is because, while the respective base stations are synchronized with each other and transmit the estimation pilot of the slot M by a directional beam coincident with the data transmission-purpose directional beam at the time of the slot M+N, the SINR can be correctly estimated by considering also the intercell inference at the time of the slot M+N.

Also, the problem in that the intercell interference cannot be properly evaluated because of the propagation time difference between the base stations may be solved as follows.

FIG. 3A shows a conceptional diagram in which estimation pilots are transmitted from base stations (BS) 11 and 12 to a mobile station (MS) 13. It is assumed that propagation times of these estimation pilots are "T1" and "T2", respectively.

FIG. 3B shows reception timing in the mobile station in a case where these estimation pilots are simultaneously transmitted between the base stations at a time instant "T0".

If the propagation times indicated in FIG. 3A are considered, then reception times of the respective estimation pilots become "T0+T1" and "T0+T2". In the case where the estimation pilot is shorter than a reception timing difference (T2−T1), because the estimation pilots between the base stations do not overlap with each other, the intercell interference cannot be correctly estimated based upon the estimation pilots. This problem can be solved as follows: the base stations are synchronized with each other, and the lengths of the estimation pilots are made sufficiently longer than a difference between propagation delay times which may be probably produced between the base stations where there are some possibilities that interference may occur between cells.

As an example, FIG. 3C represents one example of an arrangement of pilots in a slot expanded along a frequency direction. As previously described, since an estimation pilot PP 103 is required to absorb a shift in the reception timing between the cells, a longer time is allocated to this estimation pilot PP 103 along the time axis direction, as compared with a time allocated to a detection pilot DP 101 which need not absorb the above-described shift. In this case, the estimation pilot and the detection pilot are frequency-division multiplexed. A data signal is transmitted in the remaining portion of the slot at the same frequency as that of the detection pilot.

According to this invention, the downlink communication quality containing also the intercell interference is correctly estimated, and hence the adaptive modulation of the downlink communication can be operated with higher precision, and thus the frequency utilization efficiency can be improved. Particularly, since the intercell interference power can be correctly estimated, the frequency utilization efficiency of the mobile station located at the cell edge can be improved.

In addition, according to this invention, the downlink communication qualities can be estimated correctly with respect to any of directional beam patterns which are generated by the smart antenna technology. As a consequence, both the merit achieved by the spatial multiplexing operation based upon the smart antenna technology, and the merit achieved by the high-precision adaptive modulating operation based upon the correct communication quality estimation can be utilized to the maximum extent, and hence the frequency utilization efficiency can be improved due to the multiplied effect of these merits.

BRIEF DESCRIPTION OF THE DRAWINGS

FIG. 7A to FIG. 7C are explanatory diagrams showing data to be stored in various sorts of buffers according to the embodiment of this invention.

DETAILED DESCRIPTION OF THE PREFERRED EMBODIMENTS

Figure 4:
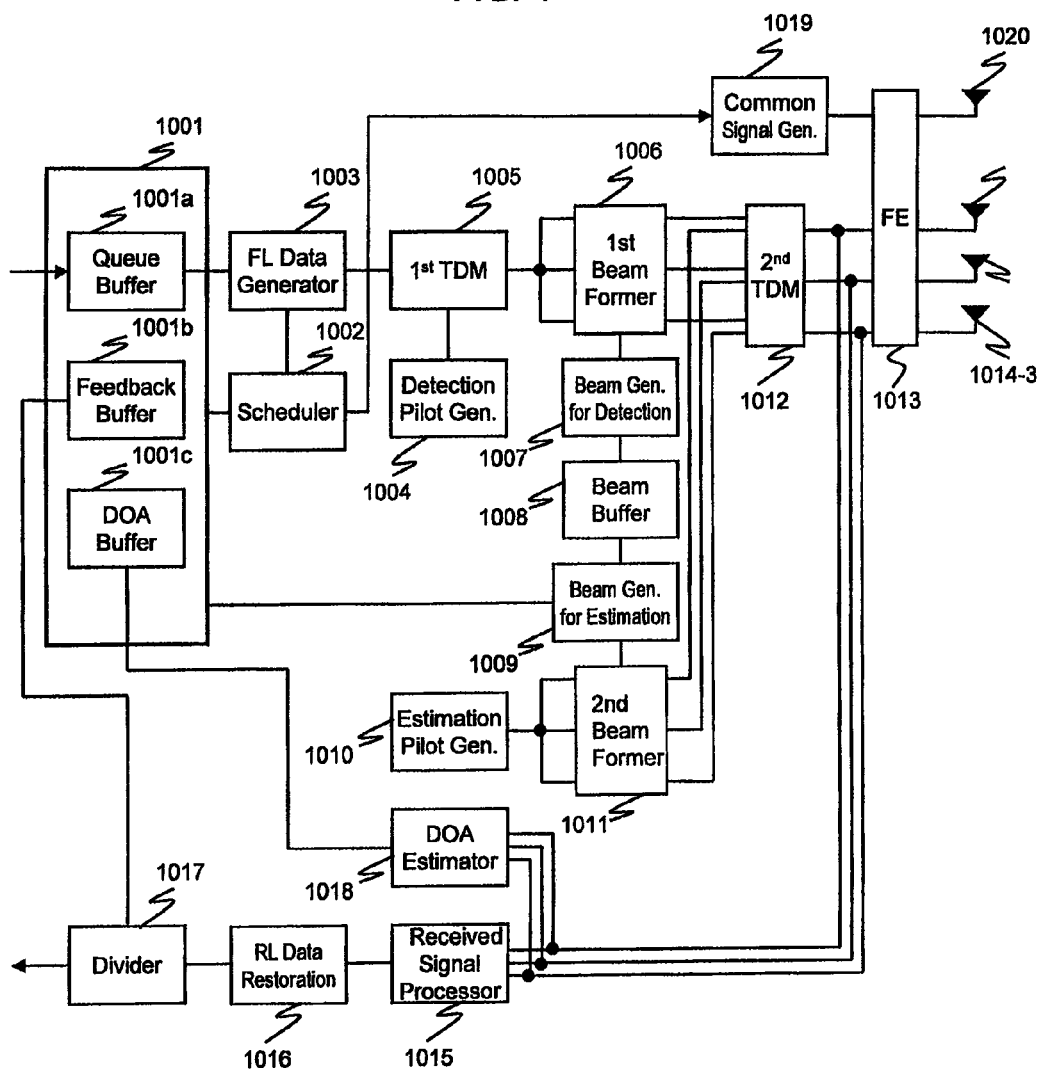
FIG. 4 is a block diagram showing a base station according to an embodiment of this invention.

FIG. 4 is a block diagram showing a configuration of a base station according to an embodiment of this invention.

A queue buffer 1001a, a feedback buffer 1001b, and a direction of arrival (DOA) buffer 1001c are realized by a memory 1001. In the queue buffer 1001a, transmission queue data to a mobile station has been stored. In the feedback buffer 1001b, feedback information related to downlink channel information (CQI) transmitted from the mobile station is recorded. In the DOA buffer 1001c, direction of the mobile station viewed from the base station has been recorded. FIG. 7 (7A to 7C) indicates data storage examples for the respective buffers.

FIG. 7A shows an example of a queue buffer.

A first column is a terminal identification number MS-ID. A second column indicates a priority, and as the priority becomes higher, a packet scheduler 1002 can select the relevant terminal easier. A third column shows a transmission interval of data in the unit of a slot, which supposes a use of the transmission interval under QoS control. When the packet scheduler is operated by 1 slot, "1's" are uniformly added to all of the rows, and such a terminal selected as a data transmission destination terminal is reset to "0". A fourth column (Bit Length) is the number of unsent bits which are left in the queue buffer. A fifth column (Bit Stream) is an actual unsent bit stream.

FIG. 7B indicates an example of a feedback buffer.

A first column is a terminal identification number; a second column is a beam identification number "Beam-ID"; and a third column is feedback information (CQI). If the feedback information is invalid, then it is indicated that there is no feedback information, and it is designed so that the relevant terminal is not allocated to the relevant beam by the packet scheduler 1002.

FIG. 7C is an example of a DOA buffer. A first column is a terminal identification number; and a second column is a direction of a mobile station viewed from a base station. The direction is expressed based upon such an angle that a predetermined direction (for example, the east) is employed as a reference. When a simultaneous transmission by spectral multiplexing is carried out, if an angle difference is not large enough, mutual interference is increased. As a result, the direction is observed in order to avoid the simultaneous transmission to a direction of the small angle.

The packet scheduler 1002 refers to the queue buffer (FIG. 7A) and the feedback buffer (FIG. 7B), and also, to the DOA buffer (FIG. 7C) if required, which are in the memory 1001, every periodic time (hereinafter, referred to as "predetermined time" defined as a time slot) so as to determine a mobile station as a data transmission destination with respect to each of the transmission directional beams. After the packet scheduler 1002 has determined the transmission destination, the packet scheduler 1002 notifies a forward link (FL) data generator 1003 of a beam identification number, a terminal identification number, a modulation system, a coding ratio, and a maximum transmittable number of bits (equivalent to MAC payload of physical packet) for every transmission directional beam.

The forward link data generator 1003 reads a bit stream for every terminal identification number from the queue buffer 1001a based upon the above-described notification information, and then, encodes the read bit stream based upon a designated coding ratio and modulates the encoded bit stream based upon a designated modulation system so as to produce forward link data. The produced forward link data is transmitted to a first time division multiplexer (1st TDM) 1005 in association with a beam identification number.

A detection pilot generator 1004 multiplies the forward link data which is known in the mobile station by an orthogonal code so as to produce detection pilots of orthogonal codes which are different from each other for every beam identification number, and then, transmits the produced detection pilots to the first time division multiplexer 1005.

The first time division multiplexer 1005 time-division multiplexes both the forward link data transmitted from the forward link data generator 1003 and the detection pilot transmitted from the detection pilot generator 1004 by the same beam identification number, and then, transmits the time-division multiplexed data and pilot to a first beam former 1006 in association with the beam identification number.

Figure 5:
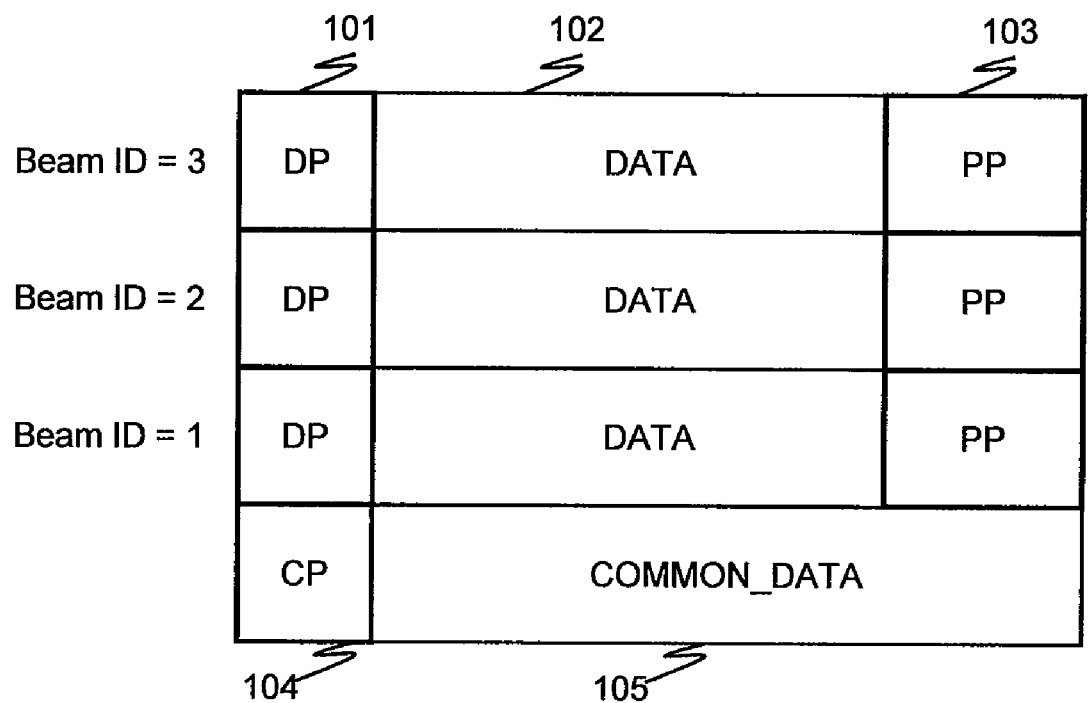
FIG. 5 is an explanatory diagram showing a slot format of the embodiment of this invention.

FIG. 5 indicates an example of a time-division multiplexed signal. In FIG. 5, DP 101 indicates a detection pilot, and DATA 102 denotes forward link data. PP 103 shows an estimation pilot which is to be time-division multiplexed in a second time division multiplexer 1012. The second time division multiplexer 1012 will be described later. It should be noted that CP 104 is a common pilot signal, and COMMON_DATA 105 shows a common control signal.

In this case, after DP 101, DATA 102, and PP 103 are time-division multiplexed with each other, the time-division multiplexed data/pilot are spatially multiplexed with signals transmitted by other directional beams, and then, both CP 104 and COMMON_DATA 105 are simultaneously transmitted in an omnidirectional manner. It should also be noted that, in the present embodiment, the time division multiplexing method has been employed as the method of multiplexing the respective pilot signals and the data signal. Alternatively, a code division multiplexing method and a frequency division multiplexing method may be employed, if a transmission signal may be restored in a mobile station on the reception side.

The first beam former 1006 distributes the output from the first time division multiplexer 1005 for every time slot toward respective transmission antennas to control an amplitude and a phase with respect to each of the antenna elements, while the amplitude and the phase correspond to a directional beam supplied from a detection beam generator 1007. The above-described control operation is carried out for every beam identification number according to the following options: a method in which the output of the first time division multiplexer 1005 may be sequentially processed for every beam identification number in a time division manner; and another method in which, while a plurality of first beam formers 1006 are provided, the output of the first time division multiplexer 1005 may be processed for every beam identification number in a parallel manner. However, even when either of these methods is performed, there is no difference in the effects of this invention. The amplitude/phase control process results which are related to all of the beam identification numbers are added to each other for every antenna element, and then, the added process results are transmitted to the second time division multiplexer 1012.

The detection beam generator 1007 notifies the first beam former 1006 of an amplitude/phase control amount corresponding to the detection directional beam of every beam identification number for every time slot, and reads an amplitude/phase control amount corresponding to a new directional beam of every beam identification number from a beam buffer 1008.

Figure 1:
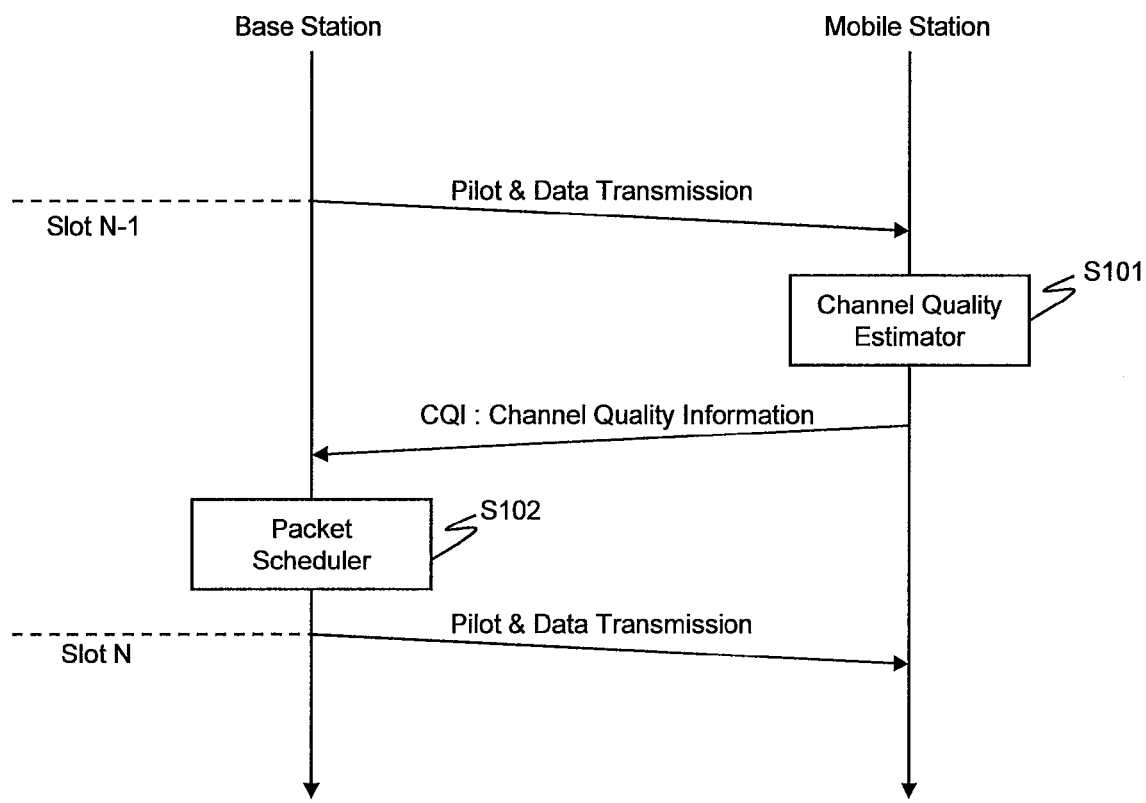
FIG. 1 is a sequential diagram showing processings performed between a base station and a mobile station in the EV-DO system.
Figure 2A:
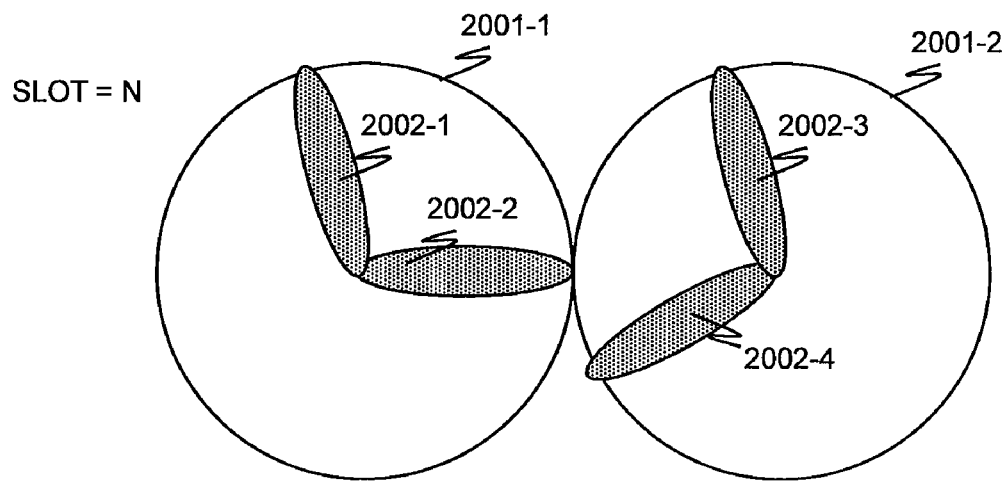
FIG. 2A and FIG. 2B are conceptional diagrams of a directional beam control.
Figure 2B:
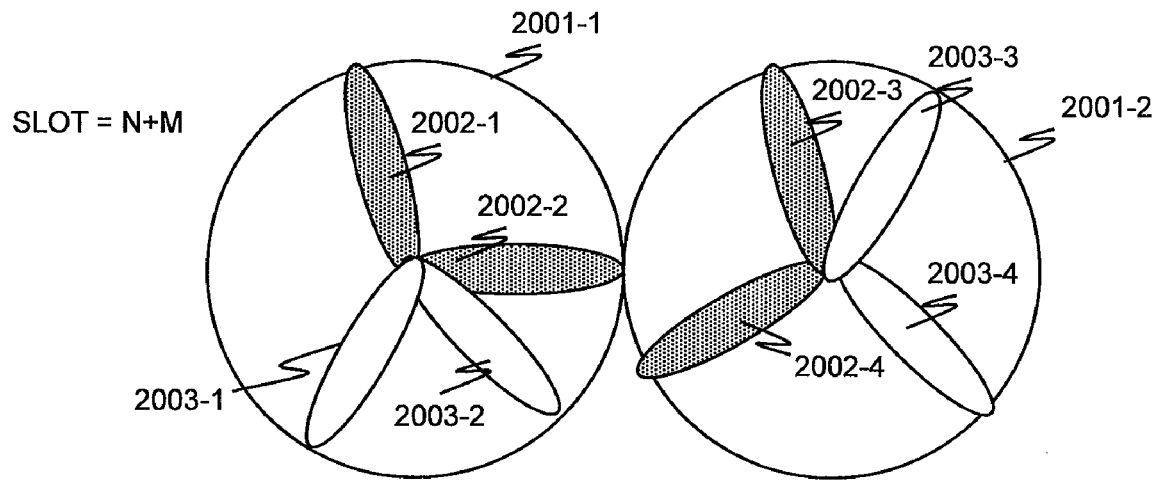
Figure 3A:
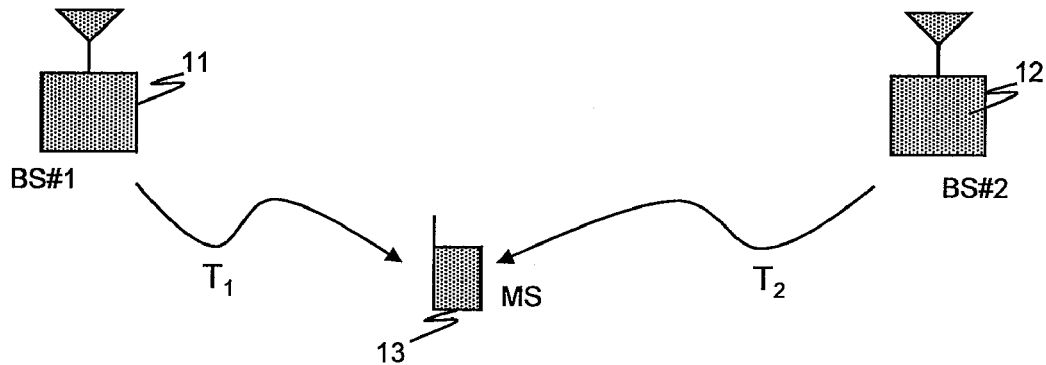
FIG. 3A to FIG. 3C are diagrams showing necessities for synchronization between base stations and setting estimation pilots to be prolonged.
Figure 3B:
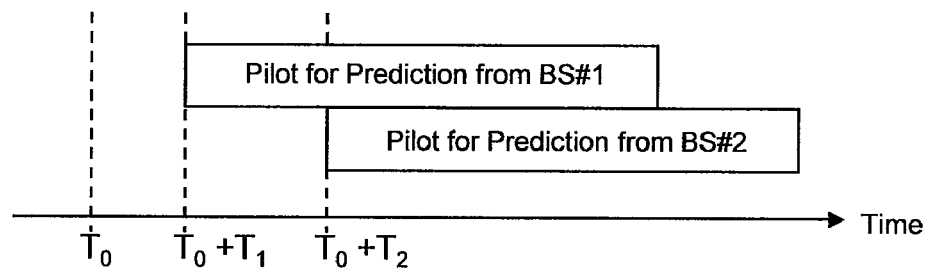
Figure 3C:
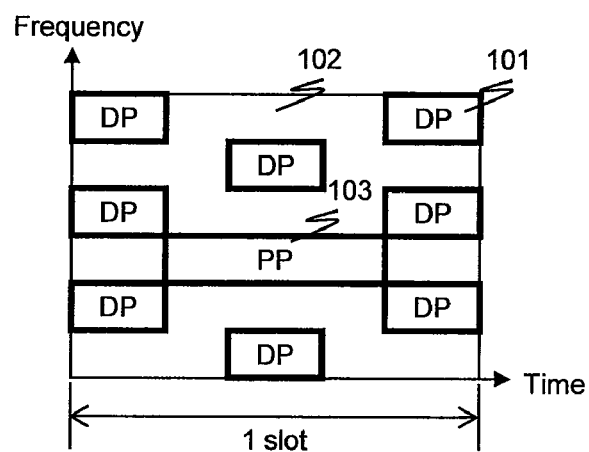

The beam buffer 1008 is a FIFO buffer. From the beam buffer 1008, an amplitude/phase control amount corresponding to the oldest directional beam is read by the detection beam generator 1007 for every time slot, whereas in the beam buffer 1008, an amplitude/phase control amount corresponding to the latest directional beam is written by an estimation beam generator 1009. It is assumed that a capacity of the beam buffer 1008 is equal to M slots of the base station shown in FIG. 2. As a result, a round trip delay which is related to a feedback from the mobile station is absorbed.

The estimation beam generator 1009 determines an estimation directional beam of each of the beam identification numbers for every time slot, writes an amplitude/phase control amount corresponding to the determined estimation directional beam in the estimation beam buffer 1008 in association with the beam identification number, and notifies a second beam former 1011 of the estimation directional beam. A detailed content of the above-described processings will be described later.

An estimation pilot generator 1010 multiplies the forward link data known in the mobile station by an orthogonal code so as to generate estimation pilots of the different orthogonal codes for every beam identification number, and then, transmits the generated estimation pilot to the second beam former 1011.

The second beam former 1011 distributes the output from the estimation pilot generator 1010 for every time slot toward the respective transmission antennas to control an amplitude and a phase with respect to each of the antenna elements, while the amplitude and the phase correspond to a directional beam supplied from the estimation beam generator 1009. The above-described control is carried out for every beam identification number. The amplitude/phase control process results which are related to all of the beam identification numbers are added to each other for every antenna element, and then, the added process results are transmitted to the second time division multiplexer 1012.

The second time division multiplexer 1012 multiplexes the output of the first beam former 1006 and the output of the second beam former 1011 in a time division multiplexing manner for every antenna element, and then, transmits the time-division multiplexed output to a front end (FE) unit 1013 for every time slot.

FIG. 5, again, represents an example of a time-division multiplexed signal. In FIG. 5, DP 101 indicates a detection pilot; DATA 102 indicates forward link data; and PP 103 indicates an estimation pilot. There is no change in the effects of this invention by arranging the pilots and the data in a temporal manner. It should be noted that the present embodiment has been described on the premise of a time division multiplexing system. Alternatively, if both the detection pilot and the data do not interfere with the estimation pilot, a code division multiplexing system may be employed.

The front end unit 1013 converts a baseband signal and an RF signal with respect to each of the antenna elements 1014-1, 1014-2, 1014-3, and 1020. The front end unit 1013 is equipped with a digital analog converter (DAC), an analog digital converter (ADC), a filter, an amplifier, and a frequency oscillator. For example, a structural example of a front end unit is disclosed in JP 2004-104040 A.

A received signal processor 1015 separates uplink signals received from the mobile stations with respect to each of the mobile stations. When the uplink signal is a CDMA signal, the received signal processor 1015 can separate the CDMA signal for every mobile station by de-spreading the CDMA signal based upon a spread code specific to the mobile station.

A reverse link (RL) data restoration unit 1016 demodulates and decodes the uplink signal output from the received signal processor 1015 for every mobile station to produce the data bit stream transmitted by the mobile station.

A divider 1017 extracts CQI feedback information from the transmitted data bit stream for every mobile station, which is equivalent to the output of the reverse link data restoration unit 1016, and then, writes the extracted CQI feedback information into the feedback buffer 1001*b*.

In a DOA estimator 1018, the uplink signal which has been converted in the baseband signal by the front end unit 1013 is input. The MUSIC method is known by which a correlation matrix of a pilot signal for every mobile station is calculated, and an arrival direction of an uplink signal is predicted based upon this fixed value analysis. The result obtained by predicting the arrival direction of every mobile station is written in the DOA buffer 1001*c* in association with the terminal identification number. When the estimation beam generator 1009 determines a directional beam, the estimation beam generator 1009 refers to the DOA buffer 1001*c*. The detailed content thereof will be discussed later.

Of the above-described structural units, it is preferable to operate the packet scheduler 1002, the first beam former 1006, the detection beam generator 1007, the estimation beam generator 1009, the second beam former 1011, and the second TDM 1012 for every time slot. In this invention, in order to synchronize the time slots among the base stations, the times among the base stations are synchronized with each other based upon GPS signals similarly to the EV-DO system.

A common signal generator 1019 acquires both a beam identification signal and a terminal identification signal from the packet scheduler 1002 to generate beam allocation control information for indicating which mobile station has been allocated to which directional beam. As to the beam allocation control information, data are rearranged, encoded, and modulated according to a protocol which has been determined between the mobile station and a wireless communication terminal. Also, the common signal generator 1019 generates a common pilot signal since all of the mobile stations within a cell are synchronized and detect a common control signal. Since the common pilot signal is simultaneously transmitted with the estimation pilot and the detection pilot, an orthogonal code different from these pilots is multiplied with the common pilot signal. The above-described beam allocation control information and the above-described common pilot signal are time-division multiplexed, and then, the time-division multiplexed signal is simultaneously transmitted with other signals to be transmitted in a directional beam. On the side of the wireless terminal, a control data restoration unit 3005 (FIG. 10) decodes the beam allocation control information, and judges whether or not data is transmitted to the own wireless terminal, and determines whether or not the data is decoded.

In the above-described embodiment, digital signal processings except for the front end unit and the antenna may be realized by DSP and field programmable gate array (FPGA), or the like.

Figures 6A, 6B:
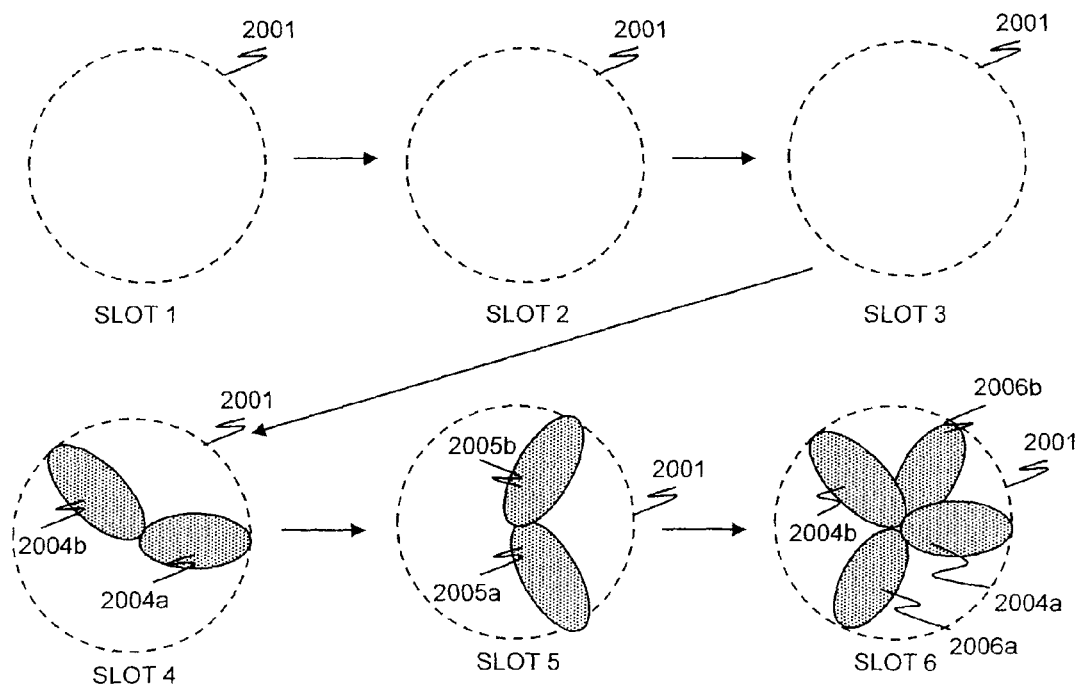
FIG. 6A and FIG. 6B are explanatory diagrams showing control in a time series of the directional beams according to the embodiment of this invention.

FIG. 6A and FIG. 6B are diagrams for describing controls of directional beams on the time axis according to this invention. It should also be noted that, since the common control signal to be transmitted in omnidirectionally is continuously output, this common control signal is omitted in the below-mentioned description.

An attention is paid to a first slot shown in FIG. 6A. In the first slot, the estimation beam generator 1009 generates a directional beam BPG#1 which is applied to an estimation pilot. "BPG#1" is an abbreviated word of "Beam Pattern Group", and implies a group of transmission directional beams which are output at the same time. At this time, since the base station does not output any signal, as represented in a first slot of FIG. 6B, no signal is output in a cell 2001.

Next, an attention is paid to a second slot of FIG. 6A. In the second slot, the estimation directional beam (BPG#1) generated in the first slot is written in the beam buffer 1008 (indicated by broken line of FIG. 6A). The second beam former 1011 performs an amplitude/phase control (indicated by solid line of FIG. 6A) which corresponds to the above-described estimation directional beam (BPG#1) with respect to the estimation pilot. On the other hand, the estimation beam generator 1009 has generated a next estimation directional beam (BPG#2). Since subsequent processings of the next estimation directional beam (BPG#2) are the same as those of the estimation directional beam (BPG#1), a description of estimation directional beam BPG#2 and succeeding beams thereof will be omitted.

Next, an attention is paid to a third slot of FIG. 6A. In the third slot, as indicated by a solid line of FIG. 6A, the estimation pilot of the directional beam processed in the second beam former 1011 of the second slot is entered in the second time division multiplexer 1012. Similarly, as indicated by the broken line of FIG. 6A, the amplitude/phase control amount of the directional beam stored in the beam buffer 1008 is read by the detection beam generator 1007. As represented in the third slot of FIG. 6B, no beam is output to the cell 2001.

Next, an attention is paid to a fourth slot of FIG. 6A. In the fourth slot, the estimation pilot of the estimation directional beam (BPG#1) time-division multiplexed by the second time division multiplexer 1012 of the third slot is output. On the other hand, the first beam former 1006 reads the amplitude/phase control amount of the directional beam (BPG#1) stored in the beam buffer 1008, and performs an amplitude/phase control with respect to both the detection pilot and the forward link data. As shown in a fourth slot of FIG. 6B, directional beams (2004a and 2004b) of "BPG#1" are output, and as previously described, the estimation pilot has been output.

An attention is paid to a fifth slot of FIG. 6A. In the fifth slot, the output (both detection pilot and forward link data to which directional gain of BPG#1 has been applied) of the first beam former 1006 of the fourth slot has been multiplexed in the time division multiplexing manner with the output (estimation pilot to which directional gain of BPG#3 has been applied) of the second beam former 1011 in the second time division multiplexer 1012. As to the output at this time, as represented in a fifth slot of FIG. 6B, an estimation pilot has been output in directional beams (2005a and 2005b) of "BPG#2".

In a sixth slot, the signal time-division multiplexed by the second time division multiplexer in the fifth slot is output. As shown in FIG. 6B, both the directional beams (2004a and 2004b) of "BPG#1" and the directional beams (2006a and 2006b) of "BPG#3" are output. In the directional beams of "BPG#1", both the detection pilot and the forward link data have been output, whereas in the directional beams of "BPG#3", the estimation pilot has been output.

The above constitutes a major aspect of the directional beam control. In combination with this directional beam control, before the first beam former performs the amplitude/phase control equivalent to BPG#1, a feedback is made by the estimation pilot transmitted based upon BPG#1, and a scheduling according to the above-described feedback information is time-division multiplexed with the detection pilot, and hence the time-division multiplexed result is transmitted. In other words, matching (same BPG) between the directional beam entered to the first beam former 1006 and the estimation directional beam which constitutes the base for generating the forward link data is a feature capable of achieving the effects of this invention.

In order to establish the matching effect, a storage amount with respect to the beam buffer 1008 is adjusted, and a delay time slot from writing operation up to reading operation with respect to this beam buffer 1008 is adjusted. In addition, the adjusted amounts are matched with each other in all of the base stations, which is required to predict correct SINR containing intercell interference.

Figure 8:
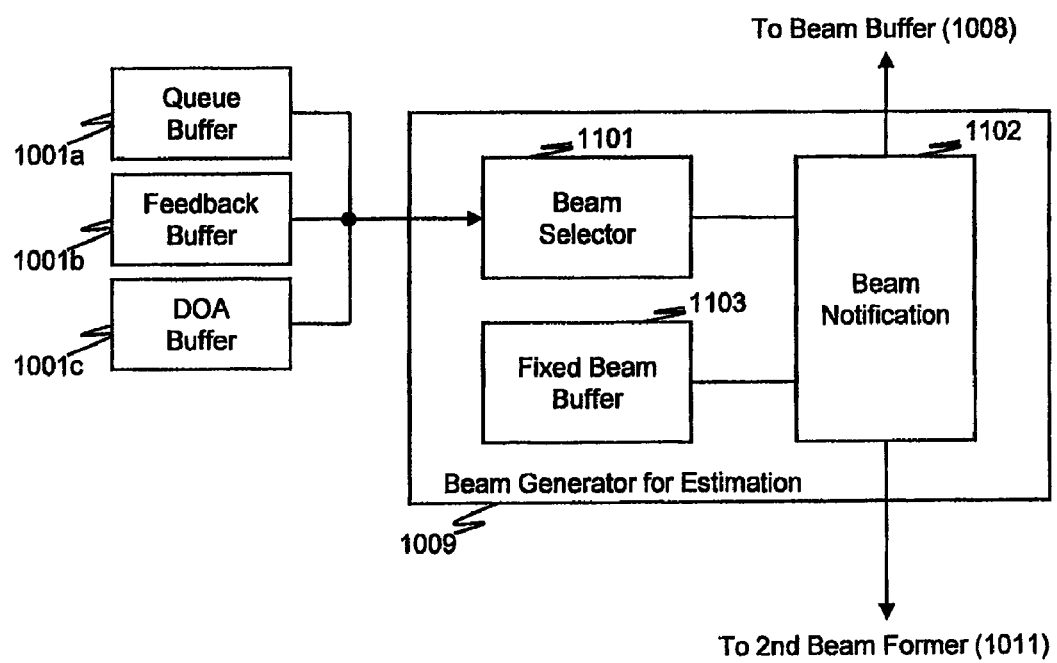
FIG. 8 is a block diagram showing a configuration for determining a directional beam of a first embodiment.

FIG. 8 represents a first embodiment mode related to an estimation directional beam decision, according to this invention.

In the first embodiment mode, a description will be made of an estimation directional beam decision in a case where the base station is a switched beam base station.

A beam selector 1101 selects a fixed beam which is utilized as an estimation directional pattern and a detection directional pattern succeeding to the estimation directional pattern by several time slots among the fixed beams held in a fixed beam buffer 1103 by the base station, and then, notifies a beam notification unit 1102 of a beam identification number thereof.

In order to select a beam direction, information held in the base station is read. Specifically, the various sorts of information are read from the queue buffer 1001a, the feedback buffer 1001b, and the DOA buffer 1001c. It should also be noted that reading of the above-described various information is not necessarily required. For example, the fixed beams may be sequentially selected, or may be selected at random.

According to the above-described fixed beam selecting method, the directional beams having low mutual interference can be easily combined with each other so as to construct a BPG, and hence a frequency utilization efficiency can be further improved.

As a consequence, since it is conceivable that the beam selector 1101 refers to different sorts of information in response to system requirements such as best effort-oriented requirements and guarantee-oriented requirements, the information may be read from the queue buffer 1001a, the feedback buffer 1001b, and the DOA buffer 1001c while supposing various fixed beam selecting methods.

The beam notification unit 1102 reads the corresponding amplitude/phase control amount from the fixed beam buffer 1103 according to the beam identification number notified from the beam selector 1101, and then, transmits the read amplitude/phase control amount to the beam buffer 1008 and the second beam former 1011.

The fixed beam buffer 1103 has recorded thereinto the amplitude/phase control amount for every antenna element in association with the beam identification number.

Figure 9:
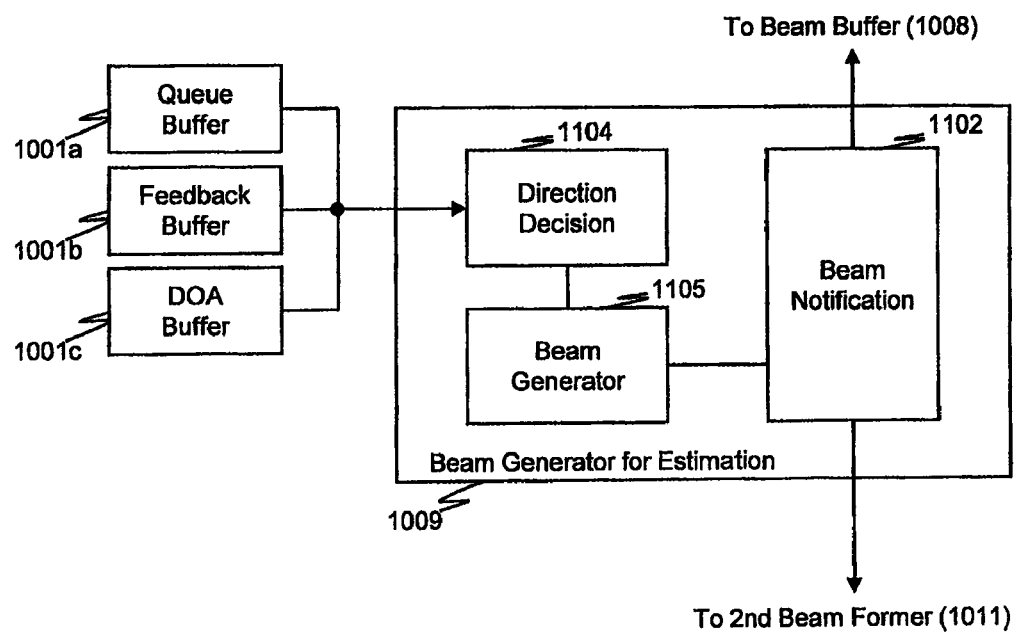
FIG. 9 is a block diagram showing a configuration for determining a directional beam of a second embodiment.

FIG. 9 represents a second embodiment mode related to an estimation directional beam decision, according to this invention.

In the second embodiment mode, a description will be made of an estimation directional beam decision in a case where the base station is a base station which outputs an arbitrary directional beam pattern.

A direction decision unit 1104 decides both a beam direction and a null direction of a directional beam generated by a beam generator 1105 for every beam identification number, and then, notifies the beam generator 1105 of the decided beam and null directions. In order to decide a beam direction, information is held in the base station and then is read. Specifically, the various sorts of information are read from the queue buffer 1001a, the feedback buffer 1001b, and the DOA buffer 1001c.

Similarly to the first embodiment mode, it is conceivable that a difference may appear in frequency utilization efficiencies, depending upon direction deciding methods. However, the effects of this invention can be achieved even when any of these direction deciding methods is employed. As a consequence, since it is conceivable that various sorts of direction deciding methods are present, the various information may be read from the queue buffer 1001a, the feedback buffer 1001b, and the DOA buffer 1001c.

The beam generator 1105 generates a transmission directional pattern for every beam identification number based upon both the beam direction and the null direction for every beam identification number, which are instructed from the direction decision unit 1104, and an arrangement of the transmission antenna. In this embodiment mode, an example for generating a directional beam based upon simple null steering is illustrated.

An array response vector along a beam direction is defined as follows:

$$B_i(\phi_i) = [b_{1,i}(\phi_i) \Lambda b_{N,i}(\phi_i)] \quad (1)$$

In the above equation, "1" denotes a beam direction counter, "$\phi_i$" denotes an "i"th beam direction, and "$b_{n,i}(\phi_i)$" denotes a phase difference from a reference point along the "i"th beam direction in an "n"th transmission antenna.

Similarly, an array response vector along the null direction may be defined as:

$$C_j(\phi_j) = [c_{1,j}(\phi_j) \Lambda c_{N,j}(\phi_j)] \quad (2)$$

In the above equation, denotes a beam direction counter, "$\psi_j$" denotes a "j"th beam direction, and "$C_{n,j}(\psi_j)$" denotes a phase difference from a reference point along the "j"th beam direction in the "n"th transmission antenna.

A weight vector, which corresponds to a vector of an amplitude/phase control amount for every antenna element in order to steer the null direction, is defined as:

$$W = [w_1 \Lambda w_N]^T \quad (3)$$

In the above equation, "$W_n$" denotes an amplitude/phase control amount applied to an antenna element, and "T" denotes a transposed matrix.

Based upon the above-described conditions, the weight vector for steering the null direction may be calculated according to the following formula:

$$W = \begin{bmatrix} B_1(\phi_1) \\ M \\ B_{Nb}(\phi_{Nb}) \\ C_1(\varphi_1) \\ M \\ C_{Nc}(\varphi_{Nc}) \end{bmatrix}^{-1} \begin{bmatrix} 1 \\ M \\ 1 \\ 0 \\ M \\ 0 \end{bmatrix} \quad (4)$$

In the above equation, "Nb" denotes the number of beam directions, and "Nc" denotes the number of null directions.

The above-calculated weight vector and the beam identification number are transmitted to the beam notification unit 1102 in association with each other.

The beam notification unit 1102 transmits both the weight vector and the beam identification number to the beam buffer 1008 and the second beam former 1011 in association with each other.

Figure 10:
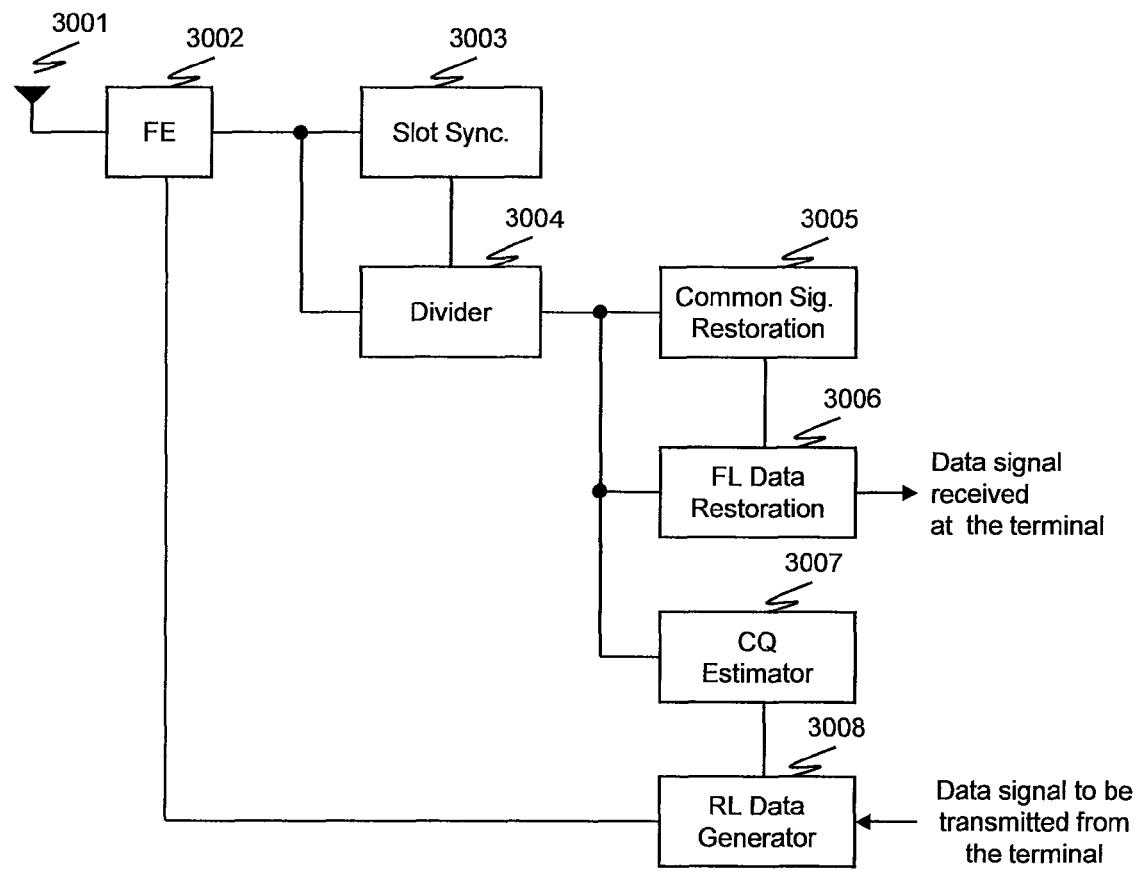
FIG. 10 is a block diagram showing a mobile station according to an embodiment mode of this invention.

FIG. 10 is a block diagram showing a configuration of a mobile station according to an embodiment mode of this invention.

The wireless communication mobile station of the present embodiment mode is equipped with a transmission/reception antenna 3001, and a front end (FE) unit 3002 which converts a baseband range and an RF range. The front end unit 3002 is equipped with a DAC, an ADC, a filter, an amplifier, and a frequency oscillator.

A slot sync unit 3003 seeks reception timing of a pilot by correlatively calculating a common pilot in order to seek a head of slots of a downlink signal, and can judge head timing of the slots based upon an offset of the pilot from the head of the slot and pilot reception timing. The head timing of the slots sought by the slot sync unit 3003 is notified to a divider 3004.

The divider 3004 divides a reception signal based upon both the slot head timing notified by the slot sync unit 3003 and the known slot format (refer to FIG. 5). Specifically, both the common pilot and the common control signals (CP 104 and COMMON_DATA 105 of FIG. 5) are transmitted to a common signal restoration unit 3005, a combination of the detection pilot and the forward link data (DP 101 and DATA 102 of FIG. 5) are transmitted to an FL data restoration unit 3006, and the estimation pilot (PP 103 of FIG. 5) is transmitted to a CQ estimator 3007.

The common signal restoration unit 3005 detects a common control signal by the common pilot. Thereafter, the common signal restoration unit 3005 demodulates or decodes the detected common control signal to acquire control data transmitted by the base station. The common signal restoration unit 3005 can grasp a terminal identifier allocated to a slot for every beam identifier from the beam allocation control information contained in the control data. The relevant mobile station compares the terminal identifier of the own mobile station with the terminal identifier allocated to the slot, and hence the relevant mobile station can grasp that a directional beam has been allocated.

If the slot has not been allocated, the common signal restoration unit 3005 notifies the FL data restoration unit 3006 of this status, and thus, the FL data restoration unit 3006 does not perform the restoring operation of the forward link data transmitted by the detection beam. On the other hand, if the slot has been allocated, the common signal restoration unit 3005 notifies the FL data restoration unit 3006 of the allocated beam identifier, and thus, the FL data restoration unit 3006 executes a process operation for restoring the forward link data transmitted by the detection beam of the beam identifier. The above-described restoring process operation implies a detecting operation, a demodulating operation, and a decoding operation.

A CQ estimator 3007 estimates an SINR for every beam identifier of the estimation beam, while the pilot of each of the estimation beams is employed as a desirable signal, and then, converts the estimated SINR into a CQI. In the case of the EV-DO system, the DRC corresponds to the above-described CQI. The CQI for every beam identifier is notified to an RL data generator 3008, but an operation in which only a CQI having the highest SINR is notified may fall into the technical scope of this invention.

The RL data generator 3008 rearranges, encodes, and modulates the data of the CQI for every beam identifier which is output from the CQ estimator 3007 according to a protocol established between the base station and the mobile station. The modulated signal is converted into the baseband-RF band in the front end unit 3002, and then, the band-converted signal is transmitted to the base station.

INDUSTRIAL APPLICABILITY

This invention may be applied to the entire downlink communications in packet exchange wireless communication systems. However, since correct estimations as to intercell interference are the target, synchronization between base stations is required. A packet exchange wireless communication system capable of supporting the synchronization between the base stations within the existing wireless communication systems corresponds only to "cdma2000 1xEV-DO". However, when synchronization means between base stations may be secured, then the above-described packet exchange wireless communication system may be similarly applied to other packet exchange wireless communication systems.

What is claimed is:

1. A wireless communication system, comprising:
a plurality of mobile stations; and
a plurality of base stations which receive downlink communication quality information feedback from the mobile stations, periodically select a mobile station of a data transmission destination with reference to the feedback downlink communication quality information, and transmit data to the selected mobile station, wherein:
each of the base stations transmits in advance estimation pilot signals for estimating downlink communication qualities after processing spatial signals and after an elapse of a predetermined time set among the base stations;
each of the mobile stations receives the estimation pilot signals to determine the downlink communication qualities, and notifies the base stations of the determined downlink communication qualities via uplinks; and
wherein the transmission data transmitted to each of the mobile stations is first multiplexed with detection pilot signals which are used for receiving transmission data and then multiplexed with the estimation pilot signals by the base stations,
wherein propagation times of transmission signals to a mobile station transmitted from a pair of the base stations located adjacent to each other are determined, and the estimation pilot signals are transmitted for a time period which is longer than a difference in the propagation times.

2. The wireless communication system according to claim 1, wherein the estimation pilot signals are transmitted for a time period which is longer than a time period of the detection pilot signals.

3. The wireless communication system according to claim 1, wherein the estimation pilot signals are transmitted by using the same directional beams as directional beams which are used to transmit the transmission data directed to each of the mobile stations after an elapse of the predetermined time.

4. A base station provided in a wireless communication system comprising:
a plurality of mobile stations; and a plurality of base stations which receive downlink communication quality information feedback from the mobile stations, periodically select a mobile station of a data transmission destination with reference to the feedback downlink communication quality information, and transmit data to the selected mobile station,
the base station comprising:
a transmission unit for transmitting in advance estimation pilot signals for estimating downlink communication qualities after processing spatial signals and after an elapse of a predetermined time set among the base stations; and
a reception unit for receiving notification of downlink communication qualities transmitted via uplinks from the mobile stations which receive the estimation pilot signals to determine the downlink communication qualities,
wherein the transmission data transmitted to each of the mobile stations is first multiplexed with detection pilot signals which are used for receiving transmission data and then multiplexed with the estimation pilot signals by the transmission unit
wherein propagation times of transmission signals to a mobile station transmitted from a pair of the base stations located adjacent to each other are determined, and the transmission unit transmits the estimation pilot signals for a time period which is longer than a difference in the propagation times.

5. The base station according to claim 4, wherein the transmission unit transmits the estimation pilot signals for a time period which is longer than a time period of the detection pilot signals.

6. The base station according to claim 4, wherein the transmission unit transmits the estimation pilot signals by using the same directional beams as directional beams which are used to transmit the transmission data directed to each of the mobile stations after elapse of the predetermined time.

7. The base station according to claim 4, wherein:
the transmission unit comprises:
a scheduler which selects a mobile station of a data transmission destination, and which schedules transmission timings of signals transmitted to the mobile stations;
a transmission data generating unit for generating forward link data to be transmitted to the selected mobile station;
an allocation information notifying unit for notifying the mobile stations of a result of the scheduling;
a detection pilot signal generator for generating pilot signals which are used for detections in the mobile stations;
a first multiplexer for time-division multiplexing the generated forward link data with the generated detection pilot signals;
a detection beam generator for generating a directional beam which is applied to an output from the first multiplexer;
a first beam former for copying the output from the first multiplexer to each of transmission antenna elements so as to perform an amplitude/phase control with which the detection beam corresponds;
an estimation pilot signal generator for generating an estimation pilot signal having a sufficiently long time with respect to a difference in propagation delay times among the base stations in order to estimate downlink communication qualities in the mobile stations;
an estimation beam generator for deciding a directional beam which is applied to the generated estimation pilot signal;
a second beam former for copying the generated estimation pilot signal to each of transmission antennas so as to perform an amplitude/phase control with which the estimation beam corresponds;
a beam buffer for storing an amplitude/phase control amount equivalent to the estimation beam generated in the past;
a second multiplexer for time-division multiplexing an output of the first beam former with an output of the second beam former for every transmission antenna element; and
a synchronizing unit for synchronizing an output of the second multiplexer among the base stations; and
the detection beam generator generates the detection beam based upon the estimation beam generated before an elapse of the time set among the base stations.

8. The base station according to claim 7, further comprising:
a direction of arrival (DOA) estimator for estimating directions of the mobile stations based upon uplink signals transmitted from the mobile stations; and
a DOA buffer for storing the directions of the mobile stations.

9. The base station according to claim 7, wherein the estimation beam generator comprises:
a fixed beam storing unit for storing an amplitude/phase control amount for every transmission antenna, with which a directional beam that does not change with time corresponds;
a beam notification unit for notifying the second beam former and the beam buffer of the amplitude/phase control amount; and
a beam selector for selecting one or more directional beams which do not change with time and are notified by the beam notification unit.

10. The base station according to claim 7, wherein the estimation beam generator comprises:
a direction decision unit for deciding a beam direction and a null direction of a directional beam to be generated;
a beam generator for generating a directional beam according to the decided direction; and
a beam notification unit for notifying the second beam former and the beam buffer of an amplitude/phase control amount with which the generated directional beam corresponds.

11. A mobile station used in a wireless communication system comprising:
a plurality of mobile stations; and a plurality of base stations which receive downlink communication quality information feedback from the mobile stations, periodically select a mobile station of a data transmission destination with reference to the feedback downlink communication quality information, and transmit data to the selected mobile station,
the mobile station comprising:
a reception unit for receiving estimation pilot signals transmitted within a time and at a frequency, which are set by the plurality of base stations, and transmitted in advance to transmit data after the set time to estimate downlink communication qualities, in order to estimate downlink communication qualities after processing spatial signals and after an elapse of a predetermined time set among the base stations; and
a transmission unit for notifying the base stations of the estimated downlink communication qualities via uplinks,
wherein the transmitted data is first multiplexed with detection pilot signals which are used for receiving transmission data and then multiplexed with the estimation pilot signals by the base stations and received by the mobile station,
wherein propagation times of transmission signals to a mobile station transmitted from a pair of the base stations located adjacent to each other are determined, and the estimation pilot signals are transmitted for a time period which is longer than a difference in the propagation times.

12. The mobile station according to claim 11, wherein:
the reception unit comprises:
a divider for receiving the downlink signals transmitted from the base stations to separate the estimation pilot signals, a combination between the detection pilot signals and the forward link data, and notification information of scheduling results, from each other; and
an forward (FL) data restoration unit for restoring transmission data from the detection pilot signals and the forward link data with reference to the notification information; and the transmission unit comprises:
a communication quality (CQ) estimator for generating downlink communication quality information which is estimated based upon the received estimation pilot signals; and
an reverse link (RL) data generator for transmitting the downlink communication quality information to the base stations.

13. The mobile station according to claim 12, wherein:
the mobile station further comprises a selector for selecting an estimation directional beam of a highest downlink communication quality; and
the mobile station does not report downlink communication quality information related to the estimation directional beams except for the selected estimation directional beam to the base stations.

14. A wireless communication system, comprising:
a plurality of mobile stations; and
a plurality of base stations which receive downlink communication quality information feedback from the mobile stations, periodically select a mobile station of a data transmission destination with reference to the feedback downlink communication quality information, and transmit data to the selected mobile station, wherein:
each of the base stations transmits in advance estimation pilot signals for estimating downlink communication qualities after processing spatial signals and after an elapse of a predetermined time set among the base stations;
each of the mobile stations receives the estimation pilot signals to determine the downlink communication qualities, and notifies the base stations of the determined downlink communication qualities via uplinks; and
the estimation pilot signals are multiplexed with transmission data transmitted to each of the mobile stations and detection pilot signals which are used for receiving transmission data,
wherein propagation times of transmission signals to a mobile station transmitted from a pair of the base stations located adjacent to each other are determined, and the estimation pilot signals are transmitted for a time period which is longer than a difference in the propagation times.

15. The wireless communication system according to claim 14, wherein the estimation pilot signals are transmitted for a time period which is longer than a time period of the detection pilot signals.

16. The wireless communication system according to claim 14, wherein the estimation pilot signals are transmitted by using the same directional beams as directional beams which are used to transmit the transmission data directed to each of the mobile stations after an elapse of the predetermined time.

17. A base station provided in a wireless communication system comprising:
a plurality of mobile stations; and a plurality of base stations which receive downlink communication quality information feedback from the mobile stations, periodically select a mobile station of a data transmission destination with reference to the feedback downlink communication quality information, and transmit data to the selected mobile station,
the base station comprising:
a transmission unit for transmitting in advance estimation pilot signals for estimating downlink communication qualities after processing spatial signals and after an elapse of a predetermined time set among the base stations; and a reception unit for receiving notification of downlink communication qualities transmitted via uplinks from the mobile stations which receive the estimation pilot signals to determine the downlink communication qualities, wherein the transmission unit multiplexes the estimation pilot signals with transmission data transmitted to each of the mobile stations and detection pilot signals which are used for receiving the transmission data, wherein propagation times of transmission signals to a mobile station transmitted from a pair of the base stations located adjacent to each other are determined, and the transmission unit transmits the estimation pilot signals for a time period which is longer than a difference in the propagation times.

18. The base station according to claim 17, wherein the transmission unit transmits the estimation pilot signals for a time period which is longer than a time period of the detection pilot signals.

19. The base station according to claim 17, wherein the transmission unit transmits the estimation pilot signals by using the same directional beams as directional beams which are used to transmit the transmission data directed to each of the mobile stations after elapse of the predetermined time.

20. The base station according to claim 17, wherein:
the transmission unit comprises:
a scheduler which selects a mobile station of a data transmission destination, and which schedules transmission timings of signals transmitted to the mobile stations;
a transmission data generating unit for generating forward link data to be transmitted to the selected mobile station;
an allocation information notifying unit for notifying the mobile stations of a result of the scheduling;
a detection pilot signal generator for generating pilot signals which are used for detections in the mobile stations;
a first multiplexer for time-division multiplexing the generated forward link data with the generated detection pilot signals;
a detection beam generator for generating a directional beam which is applied to an output from the first multiplexer;
a first beam former for copying the output from the first multiplexer to each of transmission antenna elements so as to perform an amplitude/phase control with which the detection beam corresponds;
an estimation pilot signal generator for generating an estimation pilot signal having a sufficiently long time with respect to a difference in propagation delay times among the base stations in order to estimate downlink communication qualities in the mobile stations;
an estimation beam generator for deciding a directional beam which is applied to the generated estimation pilot signal;
a second beam former for copying the generated estimation pilot signal to each of transmission antennas so as to perform an amplitude/phase control with which the estimation beam corresponds;
a beam buffer for storing an amplitude/phase control amount equivalent to the estimation beam generated in the past;
a second multiplexer for time-division multiplexing an output of the first beam former with an output of the second beam former for every transmission antenna element; and a synchronizing unit for synchronizing an output of the second multiplexer among the base stations; and the detection beam generator generates the detection beam based upon the estimation beam generated before an elapse of the time set among the base stations.

21. The base station according to claim 20, further comprising:
a direction of arrival (DOA) estimator for estimating directions of the mobile stations based upon uplink signals transmitted from the mobile stations; and
a DOA buffer for storing the directions of the mobile stations.

22. The base station according to claim 20, wherein the estimation beam generator comprises:
a fixed beam storing unit for storing an amplitude/phase control amount for every transmission antenna, with which a directional beam that does not change with time corresponds;
a beam notification unit for notifying the second beam former and the beam buffer of the amplitude/phase control amount; and
a beam selector for selecting one or more directional beams which do not change with time and are notified by the beam notification unit.

23. The base station according to claim 20, wherein the estimation beam generator comprises:
a direction decision unit for deciding a beam direction and a null direction of a directional beam to be generated;
a beam generator for generating a directional beam according to the decided direction; and
a beam notification unit for notifying the second beam former and the beam buffer of an amplitude/phase control amount with which the generated directional beam corresponds.

24. A mobile station used in a wireless communication system comprising: a plurality of mobile stations; and a plurality of base stations which receive downlink communication quality information feedback from the mobile stations, periodically select a mobile station of a data transmission destination with reference to the fed feedback downlink communication quality information, and transmit data to the selected mobile station,
the mobile station comprising:
a reception unit for receiving estimation pilot signals transmitted within a time and at a frequency, which are set by the plurality of base stations, and transmitted in advance to transmit data after the set time to estimate downlink communication qualities, in order to estimate downlink communication qualities after processing spatial signals and after an elapse of a predetermined time set among the base stations; and
a transmission unit for notifying the base stations of the estimated downlink communication qualities via uplinks,
wherein the estimation pilot signals are multiplexed with transmission data and detection pilot signals which are used for receiving the transmission data
wherein propagation times of transmission signals to a mobile station transmitted from a pair of the base stations located adjacent to each other are determined, and the estimation pilot signals are transmitted for a time period which is longer than a difference in the propagation times.

25. The mobile station according to claim 24, wherein:
the reception unit comprises:
a divider for receiving the downlink signals transmitted from the base stations to separate the estimation pilot signals, a combination between the detection pilot signals and the forward link data, and notification information of scheduling results, from each other; and an forward link (FL) data restoration unit for restoring transmission data from the detection pilot signals and the forward link data with reference to the notification information; and the transmission unit comprises:

a communication quality (CQ) estimator for generating downlink communication quality information which is estimated based upon the received estimation pilot signals; and an reverse link (RL) data generator for transmitting the downlink communication quality information to the base stations.

26. The mobile station according to claim 25, wherein:

the mobile station further comprises a selector for selecting an estimation directional beam of a highest downlink communication quality; and the mobile station does not report downlink communication quality information related to the estimation directional beams except for the selected estimation directional beam to the base stations.

* * * * *